March 6, 1962     F. H. BLITCHINGTON, JR     3,024,388
PROTECTIVE SYSTEMS
Filed Nov. 7, 1957
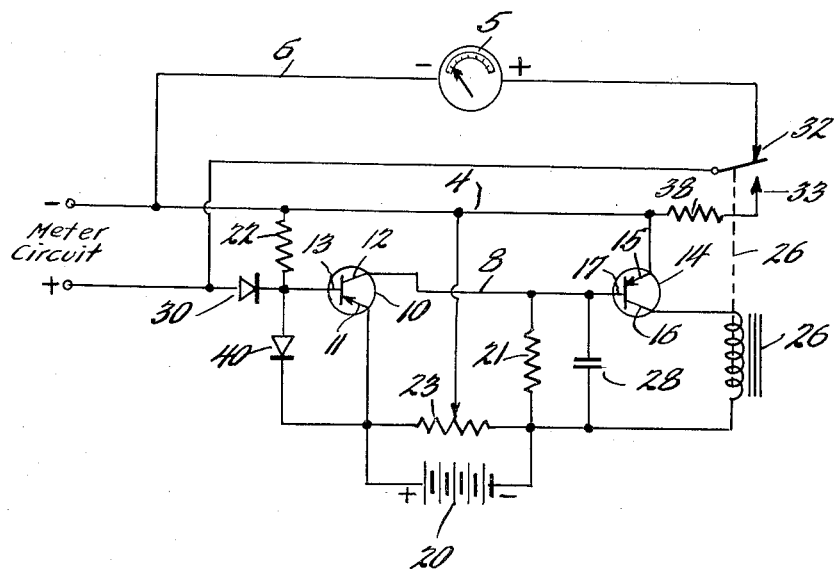
INVENTOR
Frank H. Blitchington, Jr.
BY H. J. Winegar
ATTORNEY

United States Patent Office 3,024,388
Patented Mar. 6, 1962

3,024,388
PROTECTIVE SYSTEMS
Frank H. Blitchington, Jr., Greensboro, N.C., assignor to Western Electric Company, Incorporated, New York, N.Y., a corporation of New York
Filed Nov. 7, 1957, Ser. No. 695,097
10 Claims. (Cl. 317—31)

This invention relates to protective systems and more particularly to systems for protecting electrical measuring instruments from damage resulting from excessive and destructive voltages.

In the design of electrical test apparatus it is frequently necessary to place a sensitive meter in a circuit where it may be damaged should the equipment under test prove to be defective. Various protective systems have been devised in an attempt to overcome this difficulty. One conventional system employs a circuit utilizing a sensitive relay to disconnect the electrical instrument from a circuit during an overload. However, the inertia of some sensitive relays is so great that a surge of current may ruin the meter before the sensitive relay operates.

Another conventional system uses gas-filled tubes designed to fire or conduct in response to an overload condition. Conduction of the tube usually furnishes a bypass around the meter or provides an energizing path to a relay which, when actuated, removes the meter from danger. Still other conventional systems employ coils or control windings in series with the meter, which tend to reduce meter sensitivity and interfere with the calibration thereof.

The above-mentioned conventional systems have not been entirely satisfactory. Further, the cost of gas-filled tube circuits and associated relays often exceeds the cost of the meter being protected.

An object of this invention is to provide a new and improved protective system.

Another object of this invention is to provide new and improved systems for protecting electrical measuring instruments from damage caused by destructive overload currents.

A further object of this invention is to provide a protective circuit whereby the sensitivity of the measuring instrument is not reduced by elements of the protective circuit.

A still further object of the invention is to provide a protective circuit having an improved automatic reset feature.

A system for protecting an electrical instrument subject to damage by applied voltages in excess of a predetermined value illustrating certain features of the invention may include a diode and amplifying means in series relationship connected across the instrument, and a relay connected to the output of the amplifying means. The diode and the amplifier are cooperatively effective to actuate the relay to interrupt the circuit path through the electrical instrument upon the occurrence of an applied voltage in excess of the predetermined value.

A complete understanding of the invention may be obtained from the following detailed description of a specific embodiment thereof when read in conjunction with the appended drawing.

Referring now to the drawing, a protective system, designated generally by the numeral 4, is designed to protect an electrical measuring instrument 5 in a metering circuit 6. The electrical measuring instrument 5 may be, by way of example, a conventional D.C. microampere meter.

The protective system 4 includes a two-stage transistor amplifier 8 comprising a first transistor 10 having an emitter electrode 11, a collector electrode 12 and a base electrode 13, and a second transistor 14 having an emitter electrode 15, a collector electrode 16, and a base electrode 17. Conventional symbols have been used for the transistors 12 and 14, that is, each emitter electrode is indicated by an arrow and the direction of positive emitter current is indicated by the direction of the arrow.

The transistor 10 and its associated elements constitute the first stage of the amplifier 8. The emitter 11 is connected directly to the positive terminal of a D.C. biasing source 20. A resistor 21, which supplies D.C. potential to the collector electrode 12 of the transistor 10 and the base electrode 17 of the transistor 14, is connected between the collector electrode 12 and the negative term-i nal of the D.C. biasing source 20. The base electrode 13 of the transistor 10 is connected to the negative terminal of the D.C. biasing source 20 through a fixed resistor 22 and a variable resistor 23.

The second transistor 14 and its associated elements constitute the second stage of the amplifier 8. The collector electrode 12 of transistor 10 is connected directly to the base electrode 17 of transistor 14, and the collector electrode 16 of transistor 14 is connected to the negative terminal of source 20 through the operating coil of a fast-acting relay 26. The D.C. potential on the emitter electrode 15 of transistor 14 depends upon the adjustment of the variable resistor 23. The resistor 21, connected between the base electrode 17 of the transistor 14 and the negative terminal of the D.C. biasing source 20, is in parallel with a bypass capacitor 28. The capacitor 28 provides a low impedance path for undesired frequency signals.

A diode 30, such as a silicon P–N junction diode, functions as a switch or detector to control the protective system 4. With no current flowing in the metering circuit 6, the input voltage to the diode 30, i.e., the potential on its anode, is zero. In this condition, the diode 30 will be non-conductive since there is a positive biasing potential on its cathode due to the current flowing from the emitter electrode 11 to the base electrode 13 of transistor 10 and through the resistor 22. The value of this biasing potential is determined by the adjustment of the variable resistor 23. Under normal conditions in the metering circuit, the diode 30 passes a negligible amount of current, but an overload condition, i.e., a voltage in excess of a predetermined value in the metering circuit 6, causes the potential on the anode of the diode 30 to be sufficiently positive with respect to its cathode to make the diode conduct a significant amount of current.

The current passed by the diode 30 is amplified by the above-described two-stage transistor amplifier 8, the output of which operates the fast-acting relay 26. The passed current causes the base electrode 13 of transistor 10 to become more positive, thus decreasing the collector current in the first stage of amplification. This decrease in collector current causes the base electrode 17 of transistor 14 to become more negative through the high impedance of the resistor 21. With the base electrode 17 becoming more negative, the collector current in the second stage of amplification will begin to increase. As the collector current increases, it will at some point reach the value of the operating current of the fast-acting relay 26, whereupon the relay will operate.

The relay 26 has a pair of normally closed contacts 32 through which an electrical measuring instrument 5 is connected in the metering circuit 6, and a pair of normally open contacts 33 through which a predetermined resistor 38 can be connected in the metering circuit. Thus, operation of the relay 26 opens contacts 32 to remove the instrument 5 from the circuit and closes contacts 33 to replace the instrument with the resistor 38.

The resistor 38 has a resistance slightly greater in value than that of the instrument 5 to permit the protective circuit 4 to lock-in, i.e., allow the relay 26 to remain closed throughout the duration of the overload. If the resistor 38 were equal in value to the resistance of the meter 5, the protective system 4 would "chatter," that is, cut in and out should the overload voltage fluctuate about the predetermined value of voltage that causes the diode 30 to become conductive. However, the resistor 38 may be made close enough in resistance value to that of the meter 5 so that as the overload voltage decreases, falling below the aforementioned predetermined value of voltage, the relay 26 is deactuated to replace the meter 5 in the metering circuit 6 at approximately three-quarters of full scale reading on the instrument.

As the overload voltage decreases, the potential on the anode of the diode 30 becomes less positive, that is, approaches the biasing potential on the cathode of the diode thereby decreasing the input current to the amplifier 8. The decrease in input current results in a decrease in output current, i.e., the collector current of the transistor 14. As the collector current of the transistor 14 falls below the fallout value of the relay 26, the relay deactuates to remove the resistor 38 from the metering circuit 6 and to restore the meter 5 in the metering circuit. Thus, the diode 30 functions as a switch to indirectly place the instrument 5 in and out of the metering circuit 6 so that the protective circuit has an automatic reset feature.

The amplification of the amplifier 8 is such as to multiply a significant current of relatively small magnitude initially passed by the diode 30 to a value sufficient to operate the fast-acting relay 26. Therefore, by adjusting the bias on the diode 30, the system can, in a sense, anticipate the occurrence of an excessive voltage and action is initiated to remove the instrument 5 from danger prior to the actual occurrence of the excessive voltage. It is manifest that with such an arrangement it is possible to initiate action of the protective system 4 at a voltage slightly below a predetermined overload voltage.

To prevent the transistor 10 from being damaged at the occurrence of an unusually severe overload condition, a diode 40, such as a silicon P-N junction diode designed to conduct at a predetermined voltage, is connected between the base electrode 13 and the emitter electrode 11 of transistor 10. The anode of the diode 40 is connected to the base electrode 13, the cathode to the emitter electrode 11. With the diode 40 so poled, the emitter electrode 11 is "clamped" to the base electrode 13 during the severe overload condition.

An actual embodiment of the above-described invention was used to check the performance of the protective system. A Weston ammeter model 741, having an internal resistance of 720 ohms and a range of 0–50 microamperes, was connected in the protective system and a voltage sufficient to produce a current of 50 milliamperes was applied to the meter. The circuit components used in the representative test were of the following values:

| | |
|---|---|
| Transistor 10 | Type 2N107. |
| Transistor 14 | Type 2N107. |
| Resistor 21 | 100,000 ohms. |
| Resistor 22 | 100,000 ohms. |
| Variable resistor 23 | 1600 ohms. |
| Relay 26 | 5000 ohms, resistance of operating coil. |
| Capacitor 28 | 0.1 microfarad at 200 volts. |
| Semiconductor diode 30 | Type 1N34–A. |
| Resistor 38 | 795 ohms. |
| Semiconductor diode 40 | Type 1N34. |

It should be understood that the above-listed circuit specifications of the invention may vary according to the particular instrument being protected; the above-listed circuit specifications are included by way of example only. In repeated trial operations, the protective system operated consistently to remove the meter from the circuit before the indicating needle of the meter reached the end of the meter scale.

It should be understood that the above-described system can be adapted readily to protect various electrical test instruments having different internal resistances. To set-up the protective system for a particular meter, the voltage at which it is desired to remove the particular meter from the circuit is determined. The diode 30 is then adjusted so as to conduct current at the determined voltage or at a value slightly less than the determined voltage. The voltage at which the diode 30 will pass current is preselected by the adjustment of the variable resistor 23 which regulates the biasing potential on the cathode of the diode 30. Thus with the value of voltage at which the diode 30 initiates operation of the protective system readily adjustable, the system can be easily set-up to protect various electrical instruments from excessive voltages.

It will be further understood that the illustrated embodiment of the invention is not limited to transistors of the PNP type. To use an NPN-type transistor, the battery, diodes, and input connections would be reversed.

It is manifest that various modifications of the invention may be made without departing from the spirit and scope thereof.

What is claimed is:

1. A system for protecting an electrical test instrument subject to damage from applied voltages in excess of a predetermined value, comprising a diode designed to pass current upon the occurrence of the predetermined voltage in the system, amplifying means for amplifying the current passed by the diode, a resistor slightly greater in value than the resistance of the instrument, and a relay connected to the output of the amplifying means and operable upon the passage of current by the diode to replace the instrument with the resistor in the system.

2. A system for protecting an electrical test instrument subject to damage from voltages in excess of a predetermined value, which comprises a diode designed to pass current immediately prior to the occurrence of the predetermined voltage in the system, amplifying means to amplify the current passed by the diode, a resistor, and a relay connected to the output of the amplifying means and having normally closed contacts through which the test instrument is connected in the system and normally opened contacts through which the resistor is connected in the system upon operation of the relay, said relay being operable upon the passage by the diode of a predetermined value of current to remove the instrument from the system and replace it with the resistor, said resistor being of a predetermined value slightly greater than the resistance of the test instrument so as to cause the relay to remain operated for the duration of an excessive voltage in the system and to cause the relay to be deenergized upon cessation of the excessive voltage thereby replacing the instrument in the system and removing the resistor from the system.

3. A system for protecting electrical test instruments subject to damage from voltages in excess of a predetermined value, which comprises a diode designed to pass current immediately prior to the occurrence of an excessive voltage in the system, amplifying means to amplify the current passed by the diode, a resistor, a relay connected to the output of the amplifying means and having normally closed contacts through which the electrical test instrument is connected in the system and normally opened contacts through which the resistor is connected in the system upon operation of the relay, said relay being operable upon the passage by the diode of a predetermined value of current to remove the instrument from the system and replace it with the resistor, said resistor being of a predetermined value slightly greater than the resistance of the instrument so as to cause the relay to remain operated for the duration of the excessive voltage in the system and to cause the relay to be deenergized upon cessation of the excessive voltage thereby replacing the instrument in the system and removing the resistor from the system, and means for protecting the amplifier and the relay from damage upon the occurrence of a second predetermined voltage in the system substantially in excess of said first mentioned predetermined voltage.

4. A system for protecting electrical test instruments subject to damage from voltages in excess of a predetermined value comprising a semiconductor diode designed to pass current upon the occurrence of the predetermined votlage in the system, an amplifier including a first stage transistor for amplifying the current passed by the diode, a resistor having a value substantially equal to the resistance of the instrument, a relay connected to the output of the amplifier and operable upon the passage of current by the diode to replace the instrument with the resistance, said relay having normally closed contacts through which the electrical instrument is connected in the system and normally opened contacts through which the resistance is connected in the system upon operation of the relay, said resistor being of such value as to cause the relay to remain operated for the duration of an excessive voltage in the system and to cause the relay to be deenergized upon cessation of the excessive voltage thereby replacing the instrument in the system and removing the resistance from the system, and a second semiconductor diode connected between the emitter electrode and the base electrode of the first stage transistor, said second diode designed to protect the amplifier from possible damage due to the occurrence of an unusually severe excessive voltage by rendering the emitter electrode and the base electrode at the same potential upon the occurrence of the unusually severe excessive voltage in the system.

5. A system for protecting electrical test instruments subject to damage from voltages in excess of a predetermined value comprising a semiconductor diode designed to pass current upon the occurrence of the predetermined voltage in the system, a two-stage amplifier including a first transistor and a second transistor for amplifying the current passed by the diode, a resistor slightly greater in value than the internal resistance of the instrument, a relay connected to the output of the amplifier and actuated at such time the passed current is amplified to the value of operating current of the relay whereupon the relay is operable to remove the instrument from the system and to replace the instrument with the resistance, said relay having normally closed contacts through which the electrical instrument is connected in the system and normally opened contacts through which the resistance is connected in the system upon operation of the relay, said resistor being of such value as to cause the relay to remain operated for the duration of an excessive voltage in the system and to cause the relay to be deenergized upon cessation of the excessive voltage thereby replacing the instrument in the system and removing the resistance from the system, and a second semiconductor diode connected between the emitter electrode and the base electrode of the first stage of said two-stage amplifier, said second semiconductor diode designed to protect the amplifier from possible damage due to the occurrence of an unusually severe excessive voltage by rendering the emitter electrode and the base electrode at the same potential upon the occurrence of the unusually severe excessive voltage in the system.

6. A system for protecting electrical instrument subject to damage by applied voltages in excess of a predetermined value, which comprises a diode; a transistor amplifier including a first and second junction transistor, each transistor having a base, an emitter, and a collector electrode, the amplifier being arranged in series relationship with the diode, the series arrangement of the diode and amplifier being connected across the electrical instrument; a resistor for biasing the diode, the resistor being connected across the base and emitter electrodes of the first transistor through a variable resistor; means for impressing a current through the emitter and base electrodes of the first transistor and through the biasing resistor; and a relay connected to the output of the amplifier, the diode and the amplifier actuating the relay to interrupt the circuit path through the electrical instrument upon the occurrence of an applied voltage in excess of the predetermined value.

7. A system for protecting electrical devices subject to damage by applied voltages in excess of a predetermined value, which comprises a diode; an amplifier including a semiconductor having a base, an emitter, and a collector electrode, the amplifier being arranged in series relationship with the diode, such series arrangement being connected across the protected device; a resistor substantially equal in value to the resistance of the protected device; and means connected to the output of the amplifier for replacing the protected device with the resistor upon the occurrence of an applied voltage in excess of a predetermined value.

8. A system for protecting electrical devices subject to damage by applied voltages in excess of a predetermined value, which comprises a diode; an amplifier including a semi-conductor having a base, an emitter, and a collector electrode, the amplifier being arranged in series relationship with the diode, such series arrangement being connected across the protected device; a resistor slightly greater in value than the resistance of the protected device; and a relay connected to the output of the amplifier, the relay being operable to replace the protected device by the resistor.

9. A system for protecting an electrical device subject to damage by applied voltages in excess of a predetermined value, which comprises a diode; an amplifier including a semiconductor having a base, an emitter, and a collector electrode, the amplifier being arranged in series relationship with the diode; means connected across the base and emitter electrodes of the semiconductor for biasing the diode to said predetermined value away from conduction; relay means coupled to the output of the amplifier and having a pair of normally closed contacts; a circuit connected across the diode and the biasing means, and including the protected device in series with the normally closed contacts; and means for impressing a current through the diode upon the occurrence of an applied voltage in excess of the predetermined value to operate the amplifier and the relay means to open the contacts thereof thereby opening the circuit of the protected device.

10. A system for protecting an electrical test instrument subject to damage from applied voltages in excess of a predetermined value, comprising a diode designed to pass current upon the occurrence of the predetermined voltage in the system, amplifying means for amplifying the current passed by the diode, a resistor substantially equal in value to the resistance of the instrument, and a relay connected to the output of the amplifying means and operable upon the passage of current by the diode to replace the instrument with the resistor in the system.

References Cited in the file of this patent

UNITED STATES PATENTS

| | | |
|---|---|---|
| 2,424,298 | Bailey | July 22, 1947 |
| 2,431,151 | Tellegen | Nov. 18, 1947 |
| 2,767,309 | Schaner | Oct. 16, 1956 |
| 2,767,804 | Foley | Oct. 23, 1956 |
| 2,812,476 | Braun | Nov. 5, 1957 |
| 2,828,450 | Pinchaers | Mar. 25, 1958 |
| 2,832,900 | Ford | Apr. 29, 1958 |
| 2,841,746 | Mawhinney | July 1, 1958 |
| 2,864,975 | Sumner | Dec. 16, 1958 |
| 2,866,106 | Schuh | Dec. 23, 1958 |
| 2,866,925 | Wunderman | Dec. 30, 1958 |
| 2,951,976 | Sasseen | Sept. 6, 1960 |

OTHER REFERENCES

Electronic Design, November 1, 1956, p. 25.